US006363112B1

(12) United States Patent
Azadet et al.

(10) Patent No.: US 6,363,112 B1
(45) Date of Patent: Mar. 26, 2002

(54) PARALLEL PROCESSING DECISION FEEDBACK EQUALIZER

(75) Inventors: Kameran Azadet, Middletown; Ming-Lin Yu, Morganville, both of NJ (US)

(73) Assignee: Agere Systems Guardian Corp., PA (US)

( * ) Notice: Subject to any disclaimer, the term of this patent is extended or adjusted under 35 U.S.C. 154(b) by 0 days.

(21) Appl. No.: 09/206,527

(22) Filed: Dec. 7, 1998

(51) Int. Cl.$^7$ .......................... H03K 5/159; H03H 7/30

(52) U.S. Cl. ................. 375/233; 375/232; 708/322; 708/323

(58) Field of Search .................. 375/233, 232; 708/323, 322

(56) References Cited

U.S. PATENT DOCUMENTS

| 6,021,161 A | * | 2/2000 | Yamaguchi et al. | 375/232 |
|---|---|---|---|---|
| 6,034,993 A | * | 3/2000 | Norrell et al. | 375/232 |
| 6,118,814 A | * | 9/2000 | Friedman | 375/232 |
| 6,167,082 A | * | 12/2000 | Ling et al. | 375/233 |
| 6,178,201 B1 | * | 1/2001 | Hillery | 375/232 |
| 6,188,722 B1 | * | 2/2001 | Velez et al. | 375/233 |
| 6,195,386 B1 | * | 2/2001 | Oh | 375/233 |

OTHER PUBLICATIONS

Heung–No Lee and Greory J. Pottie, "Fast Adaptive Equalization/Diversity Combining for Time–Varying Dispersive Channels", IEEE Transaction on Communications, vol. 46, No. 9, Sep. 1998, pp. 1146–1162.*

James E. C. Brown and Paul J. Hurst, "Continuous–Time Forward Equalization for the Decision–Feedback–Equalizer–Based Read Channel", IEEE Transaction on Magnetics, vol. 34, No. 4, Jul. 1998, pp. 2372–2381.*

Young–Hoon Kim and Sanyogita Shamsunder, "Adaptive Algorithms for Channel Equalization with Soft Decision Feedback", IEEE Journal on Selected Areas in Communications, vol. 16, No. 9, Dec. 1998, pp. 1660–1669.*

Stephen Oh and Domingo Garcia, "Implementation of a Parallel DFE using Residue Number System", IEEE 1994, pp. III–237–III–240.*

Kalavai Ragunath and Keshab Parhi, "Parallel Adaptive Decision Feedback Equalizers," IEEE Transactions on Signal Processing, vol. 41, No. 5, May 1993.

Danfeng Xu, Yonghua Song, Gregory T. Uehara, "TP4.7: A 200MHz 9–Tap Analog Equalizer for Magnetic Disk Read Channels in 0.6m CMOS," ISSCC Digest of Technical Papers, pp. 74–75, Feb. 1996.

* cited by examiner

Primary Examiner—Chi Pham
Assistant Examiner—Dung X. Nguyen
(74) Attorney, Agent, or Firm—Sofer & Haroun, LLP

(57) ABSTRACT

A parallel processing decision feedback equalizer is configured to receive a plurality of symbol blocks in parallel via a plurality of corresponding input branches. It is further configured to generate a plurality of decision samples. The equalizer comprises an input buffer for storing calculated decision samples corresponding to at least one previously received symbol block and a plurality of tapped delay calculators coupled to the input buffer and located in each of the input branches which are configured to calculate the first portion of a decision feedback signal corresponding to each input branch based on the impulse response samples and the decision samples stored in said input buffer.

A plurality of look-ahead-processors located in each one of the input branches and is coupled to a corresponding one of the tapped delay calculators. Each look-ahead-processor has a depth equal to the sequence order of its corresponding branch so as to calculate all possible components of a decision feedback signal for the corresponding branch. A plurality of selectors are coupled to the look-ahead processors so as to select appropriate ones of the possible components of the decision feedback signal based on decision samples obtained from previous branches.

20 Claims, 3 Drawing Sheets

PARALLEL PROCESSING DECISION FEEDBACK EQUALIZER

FIELD OF THE INVENTION

This invention relates to digital signal processing and more specifically to a decision feedback equalizer employing a parallel processing arrangement.

BACKGROUND OF THE INVENTION

There is an ever increasing demand for digital signal processors that can operate at higher and higher clock rates. In many applications—such as mass storage devices or such as those governed by Fast Ethernet 100BASE-TX and proposed 1000BASE-T Gigabit Ethernet standards—require operation at extremely high symbol rates. For example, devices employing the 100BASE-TX standard use a 125 MHz clock, which requires powerful computation capacity.

One approach to alleviate the need for such powerful computation capacity is to employ parallel processing architecture. Conceptually, in parallel processing architecture, the computation task is divided into many portions or sub-tasks. A plurality of processors operate in parallel at lower clock rates to complete their allocated portion of the task. The results from each processor are then combined to complete the required computation.

One drawback to the parallel processing approach occurs in circumstances where a feedback loop is employed. The output being calculated by one processor depends on a previous value, which may not be available until a later time. As a result the system would fail to meet its time constraints.

An example of a system that employs a feedback loop is decision feedback equalizer. Typically, a decision feedback equalizer makes use of data decisions that have already been made, to provide improved performance. Decision feedback equalizer may be employed in communication and data transfer systems, wherein a plurality of data symbols are transmitted to a receiving device. The impulse response of the communication channel can cause intersymbol interference at the receiving device. FIG. 1 is a typical impulse response of a communication channel after some linear preprocessing. Each component h(n) of the impulse response affects the received sample r(n) such that $$r(n) = h(0)t(n) + \sum_{m>0} t(n-m)h(m) \quad (1)$$

wherein t(n) is the current sample being transmitted. It is noted that the first term in equation (1) is the desired data symbol. The second term is known as post-cursor samples or previously detected data or previous decisions. These post-cursor samples are the cause of post-cursor intersymbol interference.

FIG. 2 illustrates a block diagram of a decision feedback equalizer 10 that is employed to substantially eliminate post-cursor intersymbol interference. A subtractor 12 is configured to receive data symbols r(n). The output port of subtractor 12 is coupled to the input port of slicer 14. Slicer 14 is employed to assign a value corresponding to the received symbol. The output port of slicer 14 is coupled to a tapped delay line 16, which is configured to generate a decision feedback signal defined by a sum of decision feedback components as explained in more detail below. The output port of tapped delay line 16 is coupled to a second input port of subtractor 12.

During operation, the improved reception of the current data symbol r(n) is achieved by subtracting the effect of the prior decisions from the current sample. The input to slicer 14 is given by $$s(n) = r(n) - \sum_{m>0} h(m)d(n-m) \quad (2)$$

wherein d(n) is decision samples generated at the output port of slicer 14. Assuming that the prior decision samples d(n) are computed correctly, $$s(n) = h(0)t(n) \quad (3).$$

Since it may be necessary to process signals at an extremely high clock rate, the computational steps employed in the decision feedback equalizer discussed above may not be completed within the appropriate time frames. This follows because, for example, tapped delay line 16 performs a convolution operation which involves addition and multiplication operations.

Thus, there is a need for a system and a method that can process the computational steps, similar to one discussed above, at extremely high clock rates.

SUMMARY OF THE INVENTION

In accordance with one embodiment of the invention, a parallel processing decision feedback equalizer is configured to receive a plurality of symbol blocks in parallel via a plurality of corresponding input branches. The equalizer is configured to generate a plurality of decision symbol blocks, based on prior decisions generated in response to prior symbol blocks received by the filter. An input buffer stores the decision symbols that correspond to one or more prior symbol blocks. A storage buffer stores the, L, tap coefficients h(l) of the equalizer.

The first branch of the equalizer receives the first input signal of an incoming symbol block. The next branch of the equalizer receives the next input signal of an incoming signal block. Finally, the last branch of the equalizer receives the last input signal of an incoming signal block. Those branches of the equalizer that require the decisions from a previous branch, include a plurality of look-ahead-processors.

Each branch includes a tapped delay calculator that calculates a first portion of a decision feedback signal, which is the weighted sum of decision symbols based on prior symbol decisions stored in the input buffer and the tap coefficients stored in the storage buffer. The first portion of the decision feedback signal is then provided to the corresponding look-ahead processor in each branch. Each look-ahead-processor has a depth equal to the sequence order of the corresponding input signal within a symbol block. Each look-ahead processor calculates the remaining components of the decision feedback signal based on all possible combinations of decision samples that could be generated in prior branches. As a result each look-ahead processor makes available all possible components of the decision feedback signal based on all the possible results that could be provided from the prior branches.

The look-ahead processor in each branch is coupled to one or more selectors so as to select one of the calculated and available decision symbols based on the actual decision symbols calculated from previous branches. As a result, each branch rather than waiting to begin its calculations after it has received the results from the previous branch, performs its calculations before hand and waits for the results from the previous branches only for selecting one of the results that it has already calculated.

DETAILED DESCRIPTION OF THE DRAWINGS

Figure 3B:
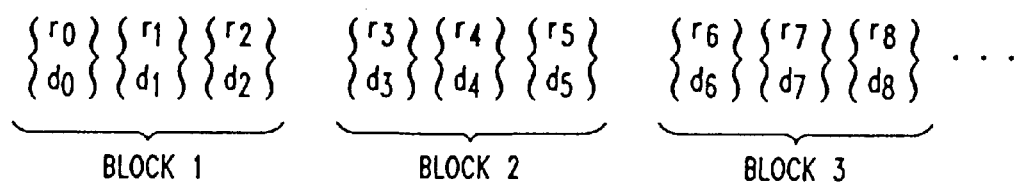
FIG. 3 is a block diagram of a parallel processing architecture that allows the computational steps described in FIG. 2 meet the time constrains even at high clock rates in accordance with one embodiment of the present invention.
Figure 3A:
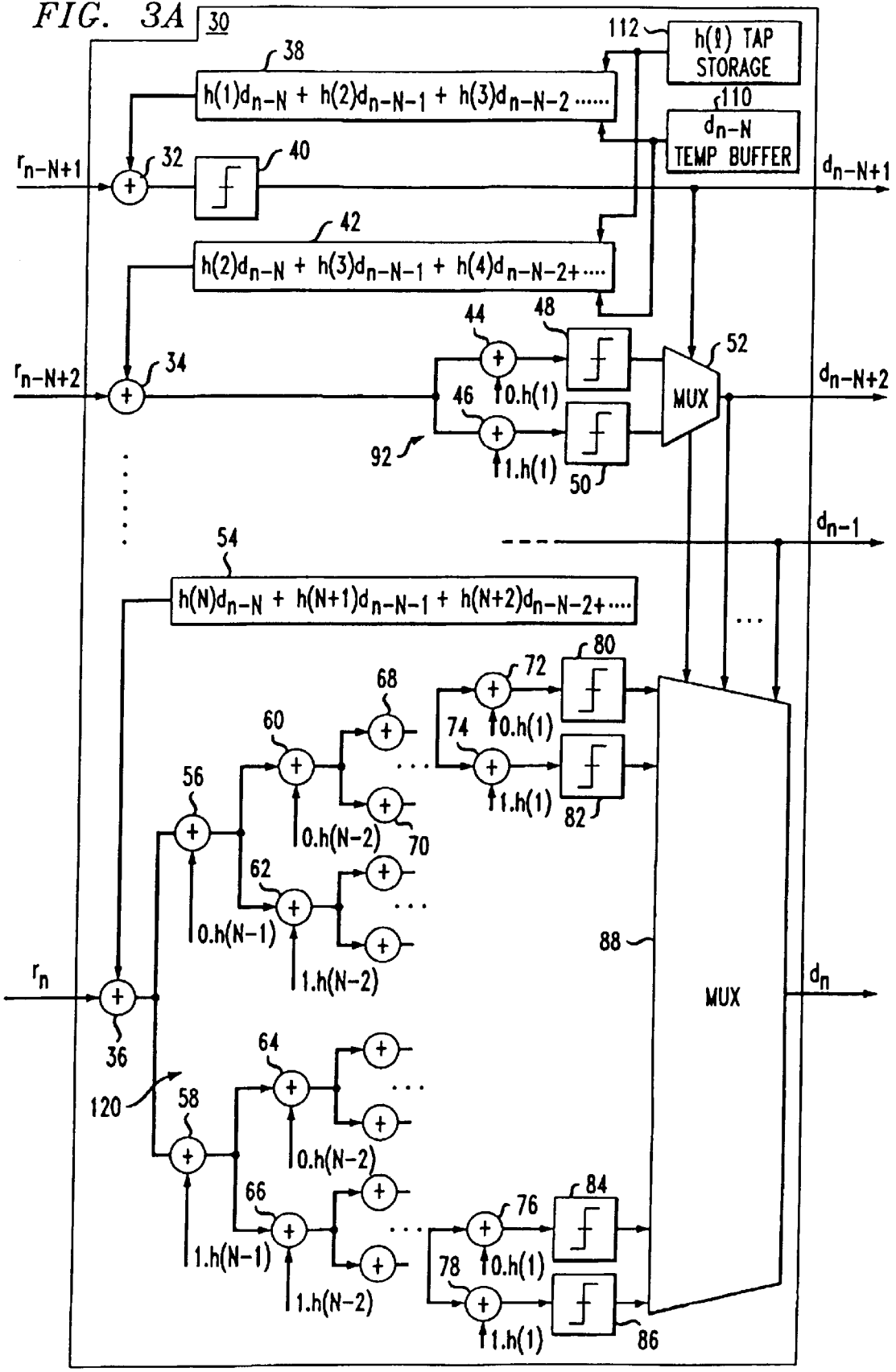

FIG. 3(a) illustrates a block diagram of a decision feedback equalizer 30 that employs a parallel architecture in accordance with one embodiment of the invention, although the invention is not limited in scope in that respect. For example, other digital signal processing systems may also employ the components that operate in accordance with the principles of the present invention.

Decision feedback equalizer 30 includes a plurality of N branches, where N is a positive integer. Each branch of equalizer 30 is configured to receive and process a corresponding signal sample as will be explained in more detail below. Thus, as illustrated, decision feedback equalizer 30 can process N signal samples at the same time. In accordance with one embodiment of the invention each set of N signal samples are referred to as a symbol block. Furthermore, the corresponding N decision output signals generated by equalizer 30 are referred to as a decision sample block. Decision feedback equalizer 30 is referred to as having a parallel processing factor of N.

FIG. 3(b) illustrates few symbol blocks arranged for a system that employs a decision feedback equalizer with a parallel processing factor of 3. Thus the first symbol block includes received samples, r(0), r(1), r(2), which are in turn provided to the decision feedback equalizer to generate the first decision block that includes decision samples, d(0), d(1), and d(2). The second symbol block includes received samples, r(1), r(2), r(3), which are in turn provided to the decision feedback equalizer to generate the second decision block that includes decision samples, d(3), d(4), and d(5). And the third symbol block includes received samples, r(6), r(7), r(8), which are in turn provided to the decision feedback equalizer to generate the third decision block that includes decision samples, d(6), d(7), and d(8).

Figure 1:
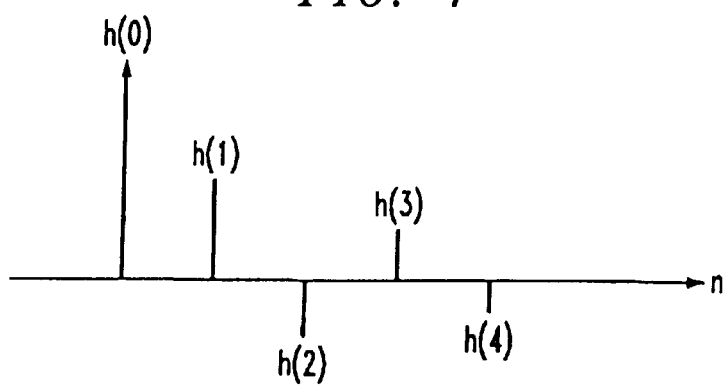
FIG. 1 is a plot representing an impulse response of a data transmission channel employed in accordance with one embodiment of the invention.
Figure 2:
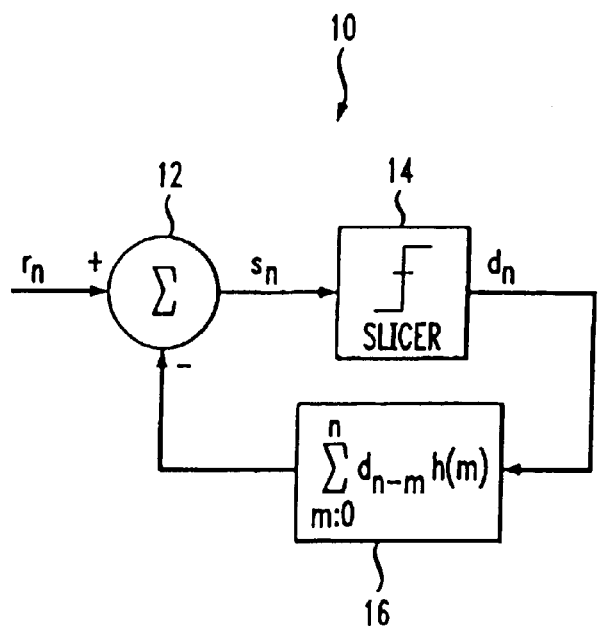
FIG. 2 is a block diagram of a decision feedback equalizer that employs data requires computational steps that may fail to fulfill the time constraints at high clock rates.

As explained before in reference with FIG. 2, each decision sample within a block depends on the prior decision samples. For example, decision sample d(3) depends on decision samples generated in response to a prior symbol block 1. Decision sample d(5) depends on decision samples d(4), d(3) and decision samples generated in response to prior symbol block 1.

Thus, in order to overcome the time delay associated with waiting for prior decision samples to be computed, feedback equalizer 30 employs look-ahead processing blocks as explained in more detail below.

Referring to FIG. 3(a), equalizer 30 is illustrated as if it is processing input signal samples r(n−N+1) through r(n), and providing decision samples d(n−N+1) through d(n). Thus, within the context of the present discussion, the decision samples d(n−N), d(n−N−1), d(n−N−2) . . . are known from processing a previous symbol block. Furthermore, the decision samples are stored in a temporary buffer 110. Equalizer 30 also includes a storage buffer 112 that stores all the tap coefficients h(l) which are impulse response samples employed by the equalizer. The number of tap coefficients, L, depends, among other things, on the processing speed of equalizer 30, the operating clock rate, and the required accuracy of the system.

The first processing branch of equalizer 30 includes a subtractor 32 which is configured to receive the first signal sample r(n−N+1) associated with an incoming symbol block at one of its input ports. The output terminal of subtractor 32 is coupled to a slicer 40. The output port of slicer 40 is arranged to provide the first decision sample d(n−N+1) within a decision block generated by equalizer 30. The other input terminal of subtractor 32 is coupled to a tapped delay calculator 38, which is configured to provide a decision feedback signal having components that are defined by corresponding weighted sum of prior decisions generated in prior blocks. The number of prior decisions employed in tapped delay calculator 38 depends on the number of tap coefficients, L. It is noted that in accordance with one embodiment of the invention, temporary buffer 110 stores L prior decision samples from the prior block. Thus, tapped delay calculator 38 provides a decision feedback signal, which is an initial weighted sum $$h(1)d(n-N)+h(2)d(n-N-1)+h(3)d(n-N-2) \tag{3}$$

wherein h(l) is the tap coefficient.

With continued reference to FIG. 3(a) the second processing branch of equalizer 30 includes a subtractor 34, which is configured to receive at one of its input ports, the second signal sample r(n−N+1) within the incoming symbol block. The other input port of subtractor 34 is coupled to a tapped delay calculator 42. Tapped delay calculator 42 provides the first portion of the decision feedback signal, which is an initial weighted sum $$h(2)d(n-N)+h(3)d(n-N-1)+h(4)d(n-N-2) \tag{4}$$

wherein h(l) is the tap coefficient.

The output terminal of subtractor 34 is coupled to a look-ahead processing block 92, which is configured to calculate all possible values of the remaining one component of the decision feedback signal based on all possible decision samples that could be generated in the prior branch, i.e. the first branch.

Look-ahead processing block 92 includes two branches. The upper branch includes an adder 44 that is coupled to the output port of subtractor 34. The output port of adder 44 is coupled to a slicer 48, which in turn is coupled to an input port of a multiplexer 52. The other input port of adder 44 is coupled to receive the first possible component of the decision feedback signal, or [0.h(1)], which is the first possible decision value from the first branch multiplied by the first impulse response h(1). For a binary arrangement, the possible decision samples generated at each branch are either "0" or "1." However, it is noted that for an "m-ary" arrangement each decision sample can have one of "m" possible values. In the event, look-ahead processing block 92 includes "m" branches, wherein each branch is arranged based on the principles discussed herein with reference to FIG. 3(a).

The lower branch of look-ahead processing block 92 includes an adder 46 that is configured to receive the output signal provided by subtractor 34. The other input port of adder 46 is configured to receive the second possible component of the decision feedback signal, or [1.h(1)], which is the second possible decision value from the first branch multiplied by first impulse response h(1). The output port of adder 46 is coupled to an input port of slicer 50, which in turn is coupled to the second input port of multiplexer 52.

The selection port of multiplexer 52 is configured to receive the decision sample d(n−N+1) generated from the prior branch, i.e., the first branch. The output port of multiplexer 52 is configured to provide the second decision sample d(n−N+2) within the decision block.

Thus, during operation, the second branch of equalizer 30 calculates the first portion of the second decision feedback signal, which is defined by an initial weighted sum based on decision samples generated in the prior symbol block. The look-ahead processor also calculates the possible remaining components of the decision feedback signal.

Each of the following branches of equalizer 30 include a tapped delay calculator that calculates the first portion of the corresponding decision feedback signal for that branch, based on the impulse coefficients and decision samples obtained during the processing of a prior symbol block. The remaining portion of the decision feedback signal for each branch is obtained by the look-ahead processing blocks which calculate and make available for selection all possible components of the decision feedback signal based on all possible outcomes of the prior branches. As the sequence order of each branch increases, the depth of the look ahead processing block also increases. For example, the depth of the look-ahead processing block of the second branch of the equalizer is equal to 1, whereas the depth of the look ahead processing block of the last branch of the equalizer is N−1, as explained hereinafter.

As illustrated in FIG. 3(a) the last branch of equalizer 30 is configured to receive the last input signal r(n) within an incoming symbol block. A subtractor 36 is coupled to receive this input signal r(n). One input port of subtractor 36 is coupled to a tapped delay calculator 54 which is configured to calculate the first portion of the decision feedback signal for that branch given by $$h(N)d(n-N)+h(N+1)d(n-N-1)+h(N+2)d(n-N-2)+ \quad (5)$$

based on impulse response sample values h(l) stored in tap storage 112, and decision samples d derived during the processing of the prior block(s) stored in buffer 110.

The output terminal of subtractor 36 is coupled to a look-ahead signal processing block 120 which is arranged as a tree structure having a depth of N−1. To this end, the output port of subtractor 36 is deemed as the first node of the tree structure defining the signal processing block 120, having corresponding first upper and lower branches. The first upper branch includes a subtractor 56 configured to receive the output signal provided by subtractor 36. The other input port of subtractor 56 is configured to receive the first possible component of the decision feedback signal for the last branch, i.e. [0.h(N−1)], based on the first possible decision outcome d(n−N+1)(in this example, "0") of the first branch of equalizer 30 and the corresponding impulse response h(N−1). The first lower branch includes a subtractor 58 configured to receive the output signal provided by subtractor 36. The other input port of subtractor 58 is configured to receive the second possible component of the decision feedback signal for the last branch, i.e. [1.h(N−1)], based on the second possible decision outcome d(n−N+1)(in this example, "1") of the first branch of equalizer 30, and the corresponding impulse response h(N−1).

The output port of subtractor 56 is deemed as the second node of the upper branch of the tree structure that defines signal processing block 120, having a second upper and lower branches. The second upper branch includes a subtractor 60 coupled to receive the output signal provided by subtractor 56. The other input of subtractor 60 is coupled to receive the next possible component of the decision feedback signal for this last branch based on the first possible outcome of decision sample d(n−N+2) of the second branch of equalizer 30, and on the second impulse response h(N−2) (i.e., [0.h(N−2)]). Similarly, the second lower branch includes a subtractor 62 coupled to receive the output signal provided by subtractor 56. The other input port of subtractor 62 is coupled to receive the next possible component of the decision feedback signal for this last branch based on the second possible outcome of the decision sample d(n−N+2) and on the second impulse response h(N−2)(i.e. ,[1.h(N−2)]).

The tree structure defining the signal processing block divides to further branches until the last upper and lower branches that include subtractors 72 and 74 respectively. Subtractor 72 is configured to receive the next possible component of the decision feedback signal based on the first possible outcome of the decision sample d(n−1) and on the corresponding impulse response h(1)(i.e., [0.h(1)]). Similarly subtractor 72 is configured to receive the next possible component of the decision feedback signal based on the second possible outcome of the decision sample d(n−1) and on the corresponding impulse response h(1)(i.e., [1.h(1)]). It is noted that the lower branches of look-ahead processing block 120 are arranged based on the same principles discussed in connection with the upper branches.

The output ports of the last subtractors 72, 74, . . . , 76, 78 are respectively coupled to a corresponding slicer 80, 82, . . . , 84,86. Thus, the output ports of these slicers include all possible components of the decision feedback signal for the last branch of equalizer 30, the appropriate ones of which are selected based on the actual outcome of decision samples derived in prior branches. The output ports of the slicers are coupled to a multiplexer 88, which is configured to provide the decision sample d(n) for this last branch of equalizer 30. The selector terminals of multiplexer 88 are configured to receive these actual outcomes of decision samples derived in prior branches.

Figure 4:
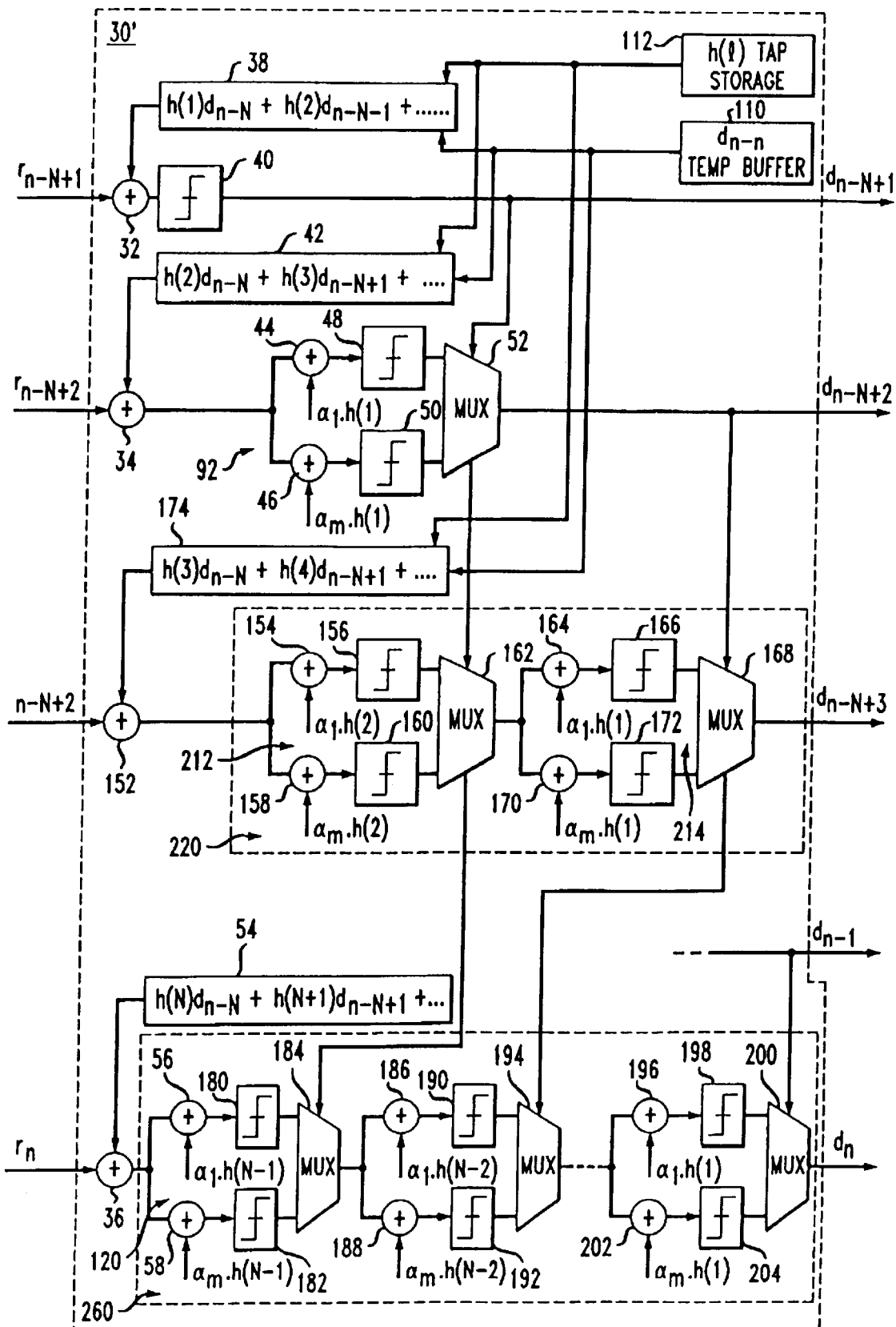
FIG. 4 is a block diagram of another embodiment of the present invention that allows the computational steps described in FIG. 2 meet the time constraints at high clock rates.

FIG. 4 illustrate a block diagram of equalizer 30' in accordance with another embodiment of the invention. In this embodiment of the invention, the look-ahead processing blocks are defined by a plurality of processing stages, wherein each stage calculates all possible components of a decision feedback signal that depend on the decision sample derived from one of the prior branches. To this end the first and second branches of decision feedback equalizer 30' has the same arrangement as the first and second branches of decision feedback equalizer 30.

As illustrated in FIG. 4, the third branch of decision feedback equalizer 30 includes a subtractor 152 configured to receive the third input signal sample r(n−N+3)of an incoming signal block. The other input port of subtractor 152 is coupled to a tapped delay calculator 174 which is configured to provide the first portion of the decision feedback signal for this third branch of equalizer 30' based on impulse response samples h(l) stored in tap storage buffer 112 and based on decision samples obtained while processing the prior signal block(s).

The output port of subtractor 152 is coupled to the first stage 212 of a look-ahead signal processing block 220. It is noted that decision feedback equalizer 30' is illustrated for an m-ary system, as a result of which, the decision samples of each branch can have one of m values α(1) . . . α(m).

Thus first stage 212 of look-ahead signal processing block 220 includes m branches for calculating all possible first components of the decision feedback signal. To this end, each branch of the first stage includes a subtractor 154, ..., 158 respectively, which are configured to receive the output signal provided by subtractor 152. The output port of each of the subtractors are coupled to a corresponding slicer 156, ..., 160. The output ports of the slicers are in turn coupled to input ports of a multiplexer 162. The selector port of multiplexer 162 is coupled to the output port of the first branch of decision equalizer 30'.

The output port of multiplexer 162 is coupled to the second stage 214 of look-ahead processing block 220, which also includes m branches for calculating all possible second components of the decision feedback signal for the third branch of equalizer 30'. To this end, each branch of the second stage includes a subtractor 164, ..., 170 respectively, which are configured to receive the output signal provided by multiplexer 162. The output port of each of the subtractors are coupled to a corresponding slicer 166,. . . , 172. The output ports of the slicers are in turn coupled to input ports of a multiplexer 168. The selector port of multiplexer 168 is coupled to the output port of the second branch of decision equalizer 30'. The output port of multiplexer 168 provides the decision sample corresponding to the third branch of equalizer 30'.

The last or Nth branch of equalizer 30' includes a look-ahead processing block 260 comprising N−1 stages as described in reference with the third branch of equalizer 30'. Thus, the last stage of block 260 also includes m branches for calculating all possible last components of the decision feedback signal for the Nth branch of equalizer 30'. To this end, each branch of the N−1 th stage includes a subtractor 196, ..., 202 respectively, which are configured to receive the output signal provided by the multiplexer of the previous stage. The output port of each of the subtractors are coupled to a corresponding slicer 198, ..., 204. The output ports of the slicers are in turn coupled to input ports of a multiplexer 200. The selector port of multiplexer 200 is coupled to the output port of the (N−1)th branch of decision equalizer 30' so as to receive decision sample d(n−1). The output port of multiplexer 200 provides the decision sample corresponding to the last branch of equalizer 30'.

Thus, during operation each stage of a look-ahead processing block located in each branch of equalizer 30' calculates all possible values for one of the components of the decision feedback signal corresponding to that branch, based on all possible values of decision samples that the corresponding prior branch could have. Once the decision sample of the corresponding prior branch is obtained, the appropriate component among all the possible components is selected without waiting for this component to be calculated.

Thus, in accordance with the teachings of the present invention, a digital signal processor can operate at very high clock rates by employing a parallel architecture and look-ahead processing blocks as explained and illustrated herein. This approach leads to remarkably more feasible decision feedback equalizers for high speed applications. Furthermore, the arrangement illustrated herein can be implemented in Very Large Scale Integrated (VLSI) design applications. It is noted that the arrangement illustrated herein can also be implemented in software format depending on design requirements.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

The foregoing merely illustrates the principles of the invention. It will thus be appreciated that those skilled in the art will be able to devise various arrangements which, although not explicitly shown or described herein, embody the principles of the invention and thus are within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects and embodiments of the invention, as well as specific examples thereof, are intended to encompass both structural and functional equivalents thereof Additionally, it is intended that such equivalents include both currently known equivalents as well as equivalents developed in the future, i.e., any elements developed that perform the same function, regardless of structure.

Thus for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner called for in the claims. Applicants thus regard any means which can provide those functionalities as equivalent to those shown herein.

We claim:

1. A parallel processing decision feedback equalizer configured to receive a plurality of symbol blocks in parallel via a plurality of corresponding input branches and further configured to generate a plurality of decision samples, said equalizer comprising:
   an input buffer for storing calculated decision samples corresponding to at least one previously received symbol block;
   an impulse response buffer for providing impulse response samples;
   a plurality of tapped delay calculators coupled to said input buffer and located in each of said input branches configured to calculate the first portion of a decision feedback signal corresponding to each input branch based on said impulse response samples and said decision samples stored in said input buffer,
   a plurality of look-ahead-processors located in each one of said input branches, and coupled to a corresponding one of said tapped delay calculators, each look-ahead-processor having a depth equal to the sequence order of its corresponding branch so as to calculate all possible components of a decision feedback signal for said corresponding branch; and
   a plurality of selectors coupled to said look-ahead processors so as to select appropriate one of said possible components of said decision feedback signal based on decision samples obtained from previous branches.

2. The system in accordance with claim 1, wherein each one of said lookahead processors is arranged based on a tree structure.

3. The system in accordance with claim 2, wherein for each branch of the equalizer, each branch of said tree arrangement further comprises a subtractor configured to receive one possible component of a decision feedback signal based on a possible outcome of decision feedback signal corresponding to a prior branch of said equalizer.

4. The system in accordance with claim 3, wherein the output port of each of said subtractors in said tree branches is a node for following tree branches.

5. The system in accordance with claim 1, wherein each of said look-ahead processing blocks comprises a plurality of processing stages.

6. The system in accordance with claim 5, wherein each of said processing stages in a look-ahead processing block calculates all possible components of a decision feedback signal that depend on the decision sample derived from a prior branch corresponding to said processing stage.

7. The system in accordance with claim 6 wherein each of said processing stages includes as many branches as the number of possible outcomes of decision samples provided at each branch of said equalizer.

8. The system in accordance with claim 7, wherein each of said branches in a processing stage is coupled to a corresponding multiplexer.

9. The system in accordance with claim 8 wherein said multiplexer is configured to receive a calculated decision sample from a corresponding prior branch of said equalizer so as to select one of the available decision feedback signals calculated by said processing stage.

10. The system in accordance with claim 1, wherein said symbol blocks comprise m-ary symbol signals.

11. The system in accordance with claim 1, wherein said symbol blocks comprise binary symbol signals.

12. The system in accordance with claim 1 further comprising an integrated circuit for containing the components of said system.

13. In a decision feedback equalizer, a parallel processing decision feedback equalization method comprising the steps of:
   receiving a plurality of symbol blocks in parallel via a plurality of corresponding input branches so as to generate a plurality of decision samples;
   storing calculated decision samples corresponding to at least one previously received symbol block;
   receiving a plurality of impulse response samples from an impulse response buffer;
   calculating the first portion of a decision feedback signal corresponding to each input branch based on said impulse response samples and said stored decision samples;
   calculating all possible components of a decision feedback signal for said corresponding branch; and
   selecting appropriate one of said possible components of said decision feedback signal based on decision samples obtained from previous branches.

14. The method in accordance with claim 13, wherein said step of calculating the first portion of a decision sample further comprises the step of employing a plurality of tapped delay calculators in each one of said input branches of said equalizer.

15. The method in accordance with claim 14, wherein said step of calculating all possible components of a decision sample further comprises the step of employing a plurality of look-ahead-processors located in each one of said input branches, having a depth equal to the sequence order of its corresponding branch.

16. The method in accordance with claim 13, further comprising the step of subtracting from said first portion of a decision feedback signal said possible components of a decision feedback signal.

17. The method in accordance with claim 13 further comprising the step of providing in each of said look-ahead processing blocks a plurality of processing stages.

18. The method in accordance with claim 17, further comprising the step of calculating in each one of said processing stages all possible components of a decision feedback signal that depend on the decision sample derived from a prior branch corresponding to said processing stage.

19. The method in accordance with claim 18 further comprising the step of providing the results of calculation in each processing stage to a multiplexer.

20. The method in accordance with claim 19 further comprising the step of receiving by said multiplexer a calculated decision sample from a corresponding prior branch of said equalizer so as to select one of the available decision feedback signals calculated by said processing stage.

* * * * *